April 4, 1967 — S. SPAMPINATO — 3,312,258
GUARDED ROUTER TOOL
Filed Sept. 29, 1964
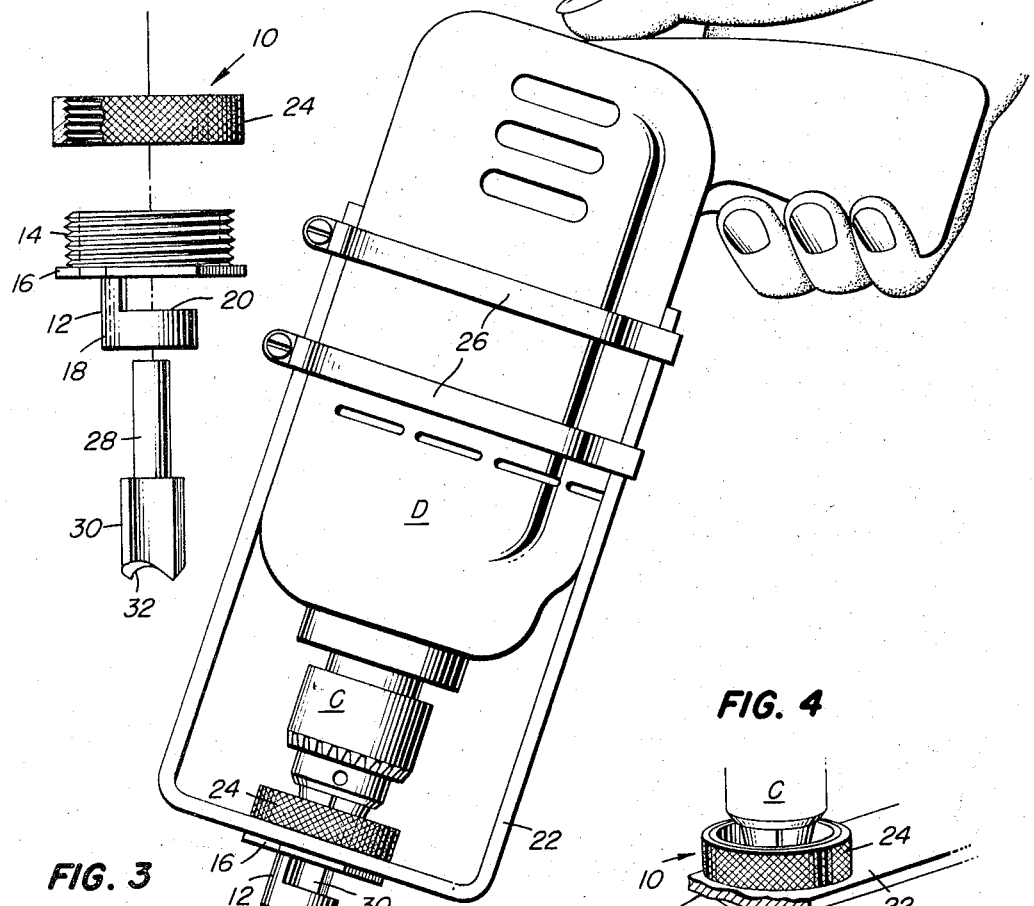
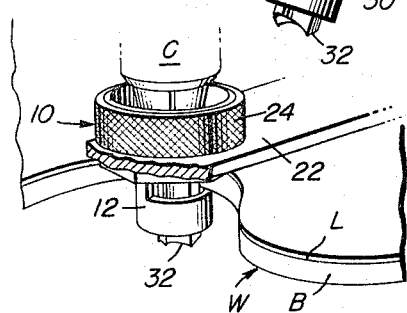
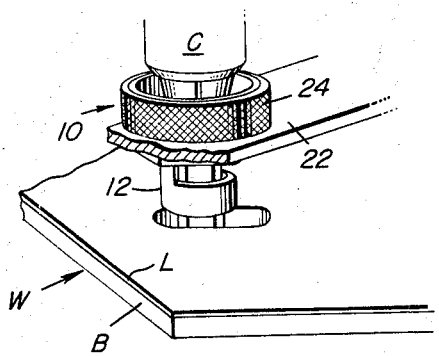
INVENTOR
Sam Spampinato
BY Walter G. Finch
ATTORNEY

United States Patent Office 3,312,258
Patented Apr. 4, 1967

3,312,258
GUARDED ROUTER TOOL
Sam Spampinato, Baltimore, Md., assignor of fifty percent to Charles J. Dekowski, Baltimore, Md.
Filed Sept. 29, 1964, Ser. No. 400,129
4 Claims. (Cl. 144—251)

This invention relates generally to tools, and more particularly it pertains to a contouring tool for edging sheets.

In cabinet making, it is common practice to apply a top laminate of synthetic material such as phenolic sheet. The edges of these sheets must be fitted to conform exactly to the underlying base. It is almost impossible to pre-cut the material to fit, especially in the case of involved shapes.

It is an object of the present invention to provide an effective cutter guard for a common router bit so that in an electric drill it can be smoothly guided to conform a laminate sheet to an underlying base of any shape.

Another object of this invention is to provide a guard for selectively exposing the end of a router bit for forming apertures in and removing the edges of thin material upon an underlying base.

Still another object of the invention is to provide an adapter for converting a drill press to a router.

Other objects and attendant advantages of this invention will become more readily apparent and understood from the following detailed specification and accompanying drawings in which:

FIG. 1 is an exploded view of the router tool of this invention;

FIG. 2 shows the tool of FIG. 1 strapmounted to an electric drill;

FIG. 3 shows the tool of the invention adapted to edge contouring work; and

FIG. 4 shows the tool performing aperture work on laminar material.

Referring now to the details of the drawings in FIGS. 1 to 4, the novel tool 10 of this invention consists of two hollow members 12 and 24 secured together for rotary adjustment in a bracket. The guard member 12 is in the form of a bushing having a threaded shank 14 with a flange 16. The flange end has a hollow cylindrical reduced axial extension 18 which is transversely slotted against the flange as at 20.

The width of this slot 20 is slightly more than the thickness of any work which is to be trimmed and if several thicknesses are to be accommodated the workman can provide himself with several appropriately slotted guards 12.

The depth of the slot 20 is approximately three-fourths of the circumference of the extension 18, although this may be subject to some variation depending on the amount of material to be removed at one pass of the tool.

The tool 10 is adapted for use on a drillpress or a hand drill by means of a right angle bracket 22. This bracket receives the threaded shank 14 in one apertured end and a knurled ring-nut 24 is used to clamp against flange 14 in any rotative position of the slot 20 desired as shown best in FIG. 2. The other end of the bracket 22 is clamped with straps 26 to the vertical post of a drill press, or to the body of an electric drill D as shown.

A cylindrical router bit 28 having straight or spiral cutting flutes 30 and a cutting end 32 is secured in the chuck C of the drill D and extends through the extension 18 of the guard 12.

In use, as shown best in FIG. 3, the edge of work W is engaged by the tool and the position of the router bit 28 which is exposed by slot 20 is used to remove the laminate L until it conforms to the underlying base B.

The exposed end of the router bit 28 is used as shown in FIG. 4 to cut to a depth, as defined by guard 12, just through the laminate L and to trim the resulting hole to various shapes as required.

By use of this improved tool 19, it is practically impossible to overcut either in a sideward operation or downwardly because of the shielding properties of the guard 10. Further, it is very simple to attach to existing drills to convert them to a router for this specialized work.

Obviously many modifications and variations of the present invention are possible in light of the above teachings. It is, therefore, to be understood that within the scope of the appended claims the invention may be practiced otherwise than as specifically described.

What is claimed is:

1. In a machine having an elongated rotary cutting tool, a cutter guard for said cutting tool, comprising a bushing for positioning around the body of said cutting tool, said bushing having a threaded shank, a tubular portion, and a flange intermediate said threaded shank and said tubular portion, said tubular portion having a transverse slot therein to expose a portion of said body of said cutting tool, a bracket member secured to said machine and having an aperture for reeciving said threaded shank and abutting said flange of said bushing, and nut means for threadably engaging said threaded shank and tightening said bracket member against said flange of said bushing.

2. In the machine of claim 1 wherein said transverse slot occupies approximately three-fourths of the circumference of said tubular member.

3. The cutter guard as recited in claim 1 wherein said cutting tool is a router bit.

4. The cutter guard as recited in claim 1 wherein said machine is a portable electric drill.

References Cited by the Examiner

UNITED STATES PATENTS

| | | | |
|---|---|---|---|
| 899,412 | 9/1908 | King | 144—251.1 |
| 2,545,399 | 3/1951 | Watkins | 51—268 |
| 2,933,021 | 4/1960 | Kennedy et al. | 144—136 |
| 2,957,375 | 10/1960 | Howlett | 77—55 |

DONALD R. SCHRAN, *Primary Examiner.*